(12) United States Patent
Ishida et al.

(10) Patent No.: US 6,461,711 B1
(45) Date of Patent: Oct. 8, 2002

(54) OPTICAL INFORMATION RECORDING MEDIUM

(75) Inventors: Toshio Ishida, Kanagawa; Kazuaki Taga, Tokyo; Yoshihisa Usami, Kanagawa, all of (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 126 days.

(21) Appl. No.: 09/614,456

(22) Filed: Jul. 12, 2000

(30) Foreign Application Priority Data

Jul. 13, 1999 (JP) .......................... 11-199469

(51) Int. Cl.⁷ ............................... B32B 3/02
(52) U.S. Cl. ................. 428/64.1; 430/270.11
(58) Field of Search .............. 428/64.1, 64.2, 428/64.4, 913; 430/270.11, 495.1, 945; 369/283

(56) References Cited

U.S. PATENT DOCUMENTS 5,590,114 A    12/1996  Murphy ................ 369/290
6,214,430 B1 *  4/2001  Kim .................... 428/64.1

FOREIGN PATENT DOCUMENTS

| JP | 2-214078 | 8/1990 | ........... G11B/23/00 |
| JP | 3-41640 | 2/1991 | ........... G11B/7/24 |
| JP | 4-61640 | 2/1992 | ........... G11B/7/24 |
| JP | 4-167239 | 6/1992 | ........... G11B/7/24 |
| JP | 2000-113511 | 4/2000 | ........... G11B/7/24 |

OTHER PUBLICATIONS

Japanese Abstract No. 10340488, dated Dec. 22, 1999.
English language abstract 2000113511 Apr. 21, 2000.
English language abstract 04061640A Feb. 27, 2000.
English language abstract 03041640A Feb. 22, 1991.
English language abstract 04167239A Jun. 15, 1992.

* cited by examiner

Primary Examiner—Elizabeth Mulvaney
(74) Attorney, Agent, or Firm—Sughrue Mion, PLLC

(57) ABSTRACT

An optical information recording medium. A light reflecting layer 14 is provided on a transparent substrate 12 which is provided with a recording portion on which information which can be played-back by laser light is recorded. A stabilization layer 16 is formed from a material of a density of 1.4 to 4.2 g/cm³, and is provided such that a center of gravity of the optical information recording medium is included within a range of 15% of a radius r of the optical information recording medium from a center C of the optical information recording medium.

20 Claims, 7 Drawing Sheets

F I G. 5 A
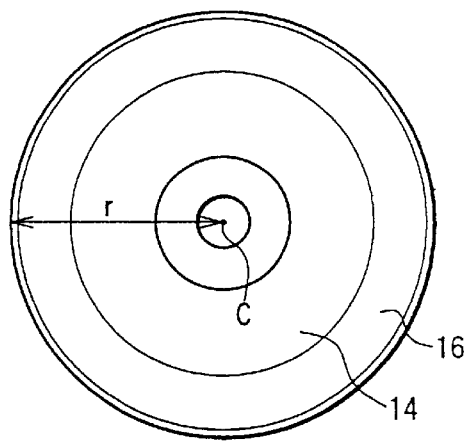
F I G. 5 B
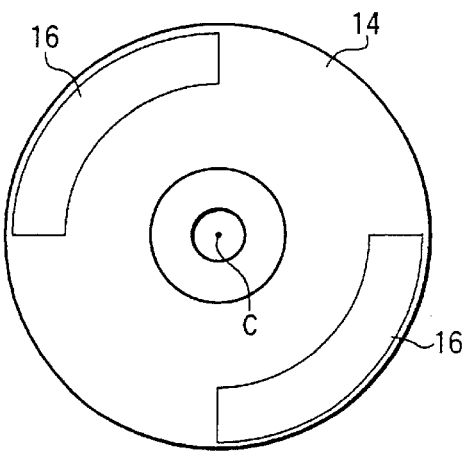
F I G. 6
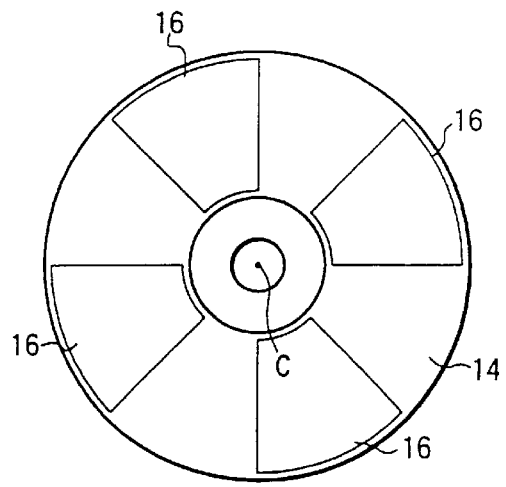
F I G. 7

F I G. 8
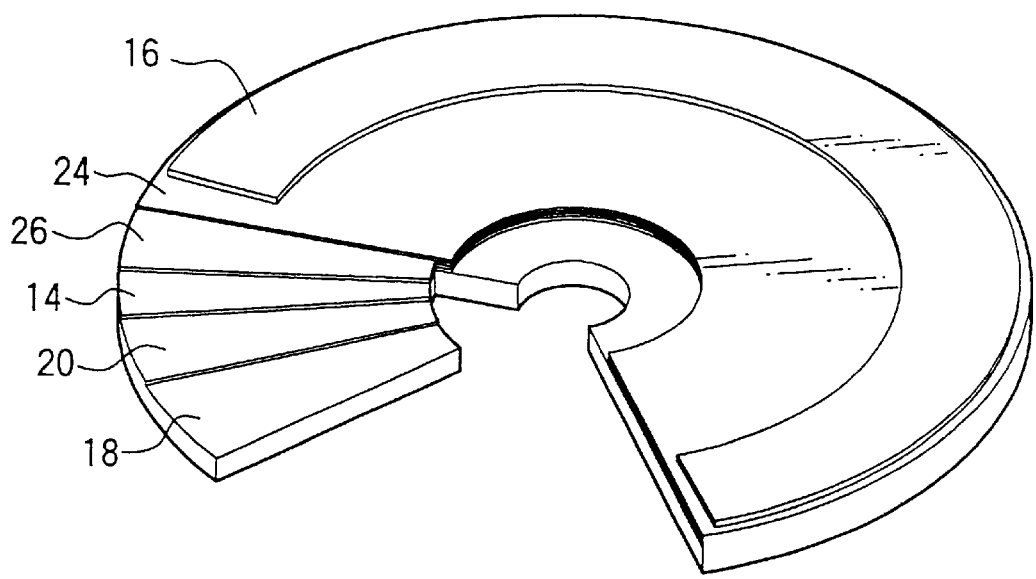

OPTICAL INFORMATION RECORDING MEDIUM

BACKGROUND OF THE INVENTION

1. Field of the Invention

The present invention relates to an optical information recording medium, and in particular, to an optical information recording medium which is suitably used as a recording medium for music.

2. Description of the Related Art

Optical information recording media, in which information is recorded and the recorded information is played-back by laser light or the like, are called optical discs, and among these, compact discs (CDs) for music playback are the most widely known. Further, writable optical information recording media (CD-R) are also used. In these optical information recording media, a digital recording/playback method is used in which recording is carried out by analog signals being converted into digital signals and the digital signals being recorded, and playback is carried out by the digital signals being converted into analog signals and the analog signals being played back. In this digital recording/playback method, even if errors occur during the time from recording to playback, if the playback device can read encoded pulse strings, the errors can be corrected such that the original analog signals can be reproduced. Thus, conventionally, effects that the structure of the optical information recording medium itself has on the recording/playback characteristic have been thought to be small.

Although few in number, there have been inventions which focus on the effects that the structure of an optical information recording medium has on the recording/playback characteristic. For example, Japanese Patent Application Laid-Open (JP-A) No. 2-214078 discloses an invention which improves the playback sound quality of a compact disc. In this invention of JP-A-2-214078, one surface of an optical disc is covered by layer which is formed from a soft, flexible material such as rubber and absorbs and dampens vibrations, and the natural frequency of the disc is absorbed by the soft, flexible member, so as to improve the quality of the playback sound. However, there is the problem with this optical disc of JP-A-2-214078 in that vibration of a frequency which differs from the natural frequency of the optical disc is generated, such that an improvement in sound quality is not always obtained. Further, since a material such as rubber or the like is layered on the disc surface, problems arise with the handling of discs, such as plural discs stick to one another, it is difficult to write with a pen or pencil on the surface of the disc, and the like.

In recent years, as the popularity of CD-Rs has increased, copy-protected CD-Rs exclusively for music have been developed, and further improvement of the recording/playback characteristic (especially sound quality) has been required.

SUMMARY OF THE INVENTION

An object of the present invention is to provide an optical information recording medium having improved sound quality.

In order to achieve the above object, the present invention provides an optical information recording medium comprising: either a disk-shaped transparent substrate on which is provided a recording portion formed from a light absorbing layer in which information can be recorded by laser light, or a disk-shaped transparent substrate provided with a recording portion in which information which can be played-back by laser light is recorded; a light reflecting layer provided on the recording portion; and a stabilization layer formed from a material having a density of 1.4 to 4.2 g/cm$^3$ and provided on the light reflecting layer, such that a center of gravity of the optical information recording medium is included within a range of 15% of a radius of the optical information recording medium from a center of the optical information recording medium.

Since this optical information recording medium comprises the stabilization layer formed of a material having a density of 1.4 to 4.2 g/cm$^3$, which is a relatively heavy material compared to other materials of the medium, sounds whose balance is good from the intermediate frequency to the low frequency in the audible range and which are stable and pleasant can be obtained. Further, the stabilization layer is provided such that the center of gravity of the optical information recording medium is within a range of 15% of the radius of the optical information recording medium from the center of the optical information recording medium in order to avoid excessive eccentricity of the optical information recording medium. Although the reason why the optical information recording medium results in improved sound quality is unclear, it is thought that the stabilization layer presses the optical information recording layer in a perpendicular direction such that the optical information recording medium is stable, and as a result, vibrations during rotation are suppressed such that sound quality is improved.

BRIEF DESCRIPTION OF THE DRAWINGS

FIG. 5A is a sectional view of another optical information recording medium of the present invention.

FIG. 5B is a plan view of the optical information recording medium of FIG. 5A.

FIG. 6 is a plan view of still another optical information recording medium of the present invention.

FIG. 7 is a plan view of another optical information recording medium of the present invention.

FIG. 8 is a perspective view of a CD-R according to the present invention.

DESCRIPTION OF THE PREFERRED EMBODIMENTS

An optical information recording medium of the present invention will be described in detail hereinafter.

Figure 1:
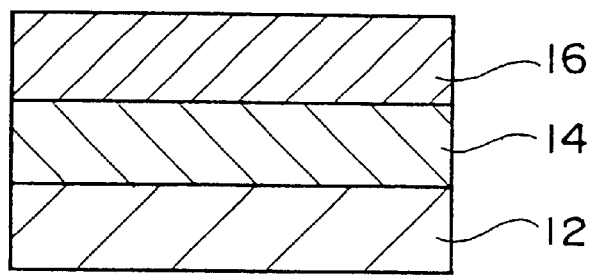
FIG. 1 is a sectional view illustrating an example of a layer structure of an optical information recording medium of the present invention.
Figure 2:
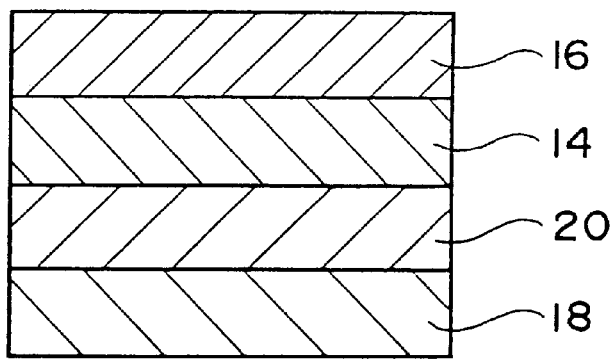
FIG. 2 is a sectional view illustrating an example of another layer structure of the optical information recording medium of the present invention.

First, the structure of the optical information recording medium of the present invention will be described. When the optical information recording medium of the present invention is a CD which is an optical information recording medium exclusively for playback, as illustrated in FIG. 1, the optical information recording medium is structured such that at least a light reflecting layer 14 and a stabilization layer 16 are provided in that order on a disc-shaped transparent substrate 12 on which information which can be played-back by laser light is recorded. When the optical information recording medium of the present invention is a CD-R which is a writable optical information recording medium or is a CD-RW which is a rewritable optical information recording medium, as illustrated in FIG. 2, the optical information recording medium is structured such that at least a light absorbing layer 20 in which information can be recorded by laser light, the light reflecting layer 14, and the stabilization layer 16 are provided in that order on a disc-shaped transparent substrate 18 in which a pre-groove is formed. Further, as illustrated in FIG. 3A and FIG. 3B, by providing a coloring agent layer 24 between the light reflecting layer 14 and the stabilization layer 16, the sound quality can be improved even more. Further, if needed, protective layers or intermediate layers may be provided. The respective layers will be described in detail hereinafter.

The stabilization layer 16 is formed from a material having a density of 1.4 to 4.2 g/cm$^3$. If the density of the material is less than 1.4 g/cm$^3$, a sound quality improving effect which is audibly discernable cannot be obtained. If the density of the material exceeds 4.2 g/cm$^3$, the load applied to the optical information recording medium when the medium rotates is too large. The density of the material is preferably 1.4 to 3.0 g/cm$^3$, and more preferably 1.4 to 2.0 g/cm$^3$. Provided that their densities fall within the aforementioned ranges, inorganic substances such as SiO, SiO$_2$, MgF$_2$, SnO$_2$, Si$_3$N$_4$, TiO$_2$, and BaO$_2$, and organic substances such as thermoplastic resins, thermosetting resins, and UV-curing resins may be used as the material for the stabilization layer 16. Among these, titanium compounds are preferable and TiO$_2$ is particularly preferable, from the standpoints of a large specific gravity and ease of adjusting the density. One of these materials may be used alone, or a combination of two or more materials may be used.

In a case in which an inorganic substance such as, for example, TiO$_2$, BaO$_2$ or the like is used as the material for the stabilization layer 16, the stabilization layer 16 may be formed by dispersing the inorganic substance in a binder resin such as a UV-curing resin, and applying the binder resin in which the inorganic substance is dispersed onto the light reflecting layer 14 by screen printing or the like. At this time, the mixing ratio of the inorganic substance and the binder resin may be set appropriately such that the mixture has a desired density. Further, the stabilization layer 16 may also be formed by making the binder resin, in which the inorganic substance is dispersed, into a film by an extrusion process, and thereafter, laminating this film onto the light reflecting layer by using an adhesive. Moreover, the stabilization layer 16 may be formed by depositing the inorganic substance onto the light reflecting layer 14 directly by vacuum deposition, sputtering, or the like.

When a thermoplastic resin or a thermosetting resin is used as the material for the stabilization layer 16, the stabilization layer 16 may be formed by dissolving the resin in an appropriate solvent so as to prepare a coating solution, and thereafter, applying the coating solution onto the light reflecting layer 14 by screen printing or the like, and drying the coated layer. In particular, when an ultraviolet-(UV-) curing resin is used, the stabilization layer 16 may be formed by applying the UV-curing resin or a coating solution in which the UV-curing resin is dissolved in an appropriate solvent onto the light reflecting layer 14, and curing the coated film by irradiating UV light. In order to prevent warping of the disc, UV-curing resins are preferable as their cure shrinkage is low.

Figure 3:
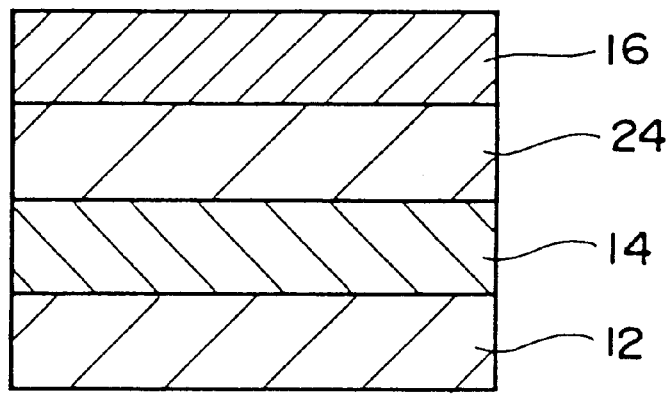
FIGS. 3A and 3B are sectional views illustrating an example of another layer structure of the optical information recording medium of the present invention.
Figure 3:
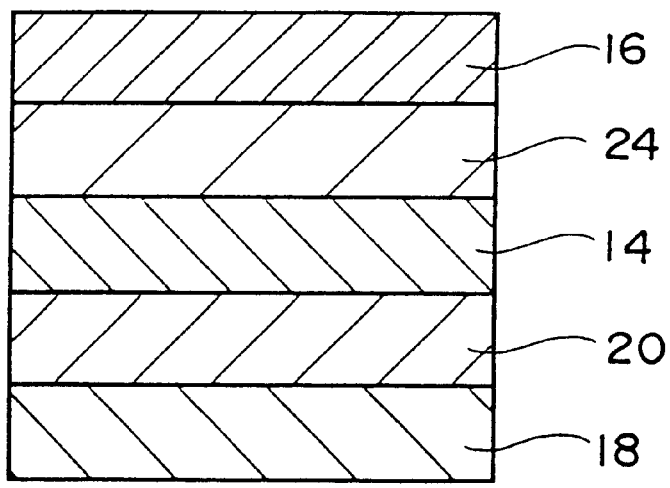

As illustrated in FIGS. 1 through 3, the stabilization layer 16 may be provided so as to cover the entire surface of the light reflecting layer 14, or, as illustrated in FIGS. 5A, 5B, 6 and 7, may be provided at a portion of the surface of the light reflecting layer 14. In FIGS. 5A and 5B, the stabilization layer 16 is provided along the entire circumference of the outer peripheral portion of the surface of the light reflecting layer 14. In FIG. 6, the stabilization layer 16 is provided at portions of the outer peripheral portion of the surface of the light reflecting layer 14. In FIG. 8, the stabilization layer 16 is provided radially at the surface of the light reflecting layer 14.

Figure 4:
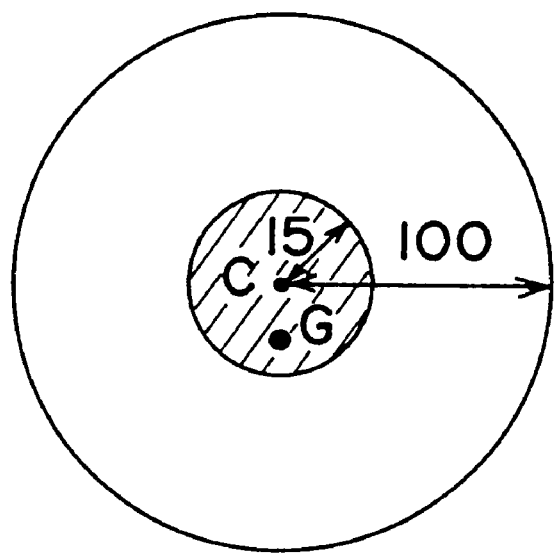
FIG. 4 is a plan view illustrating the relationship between the position of the center of gravity and the position of the center of the optical information recording medium of the present invention.

In any of these cases, in order to avoid eccentricity, as illustrated in FIG. 4, the stabilization layer 16 is provided such that a center of gravity G of the optical information recording medium is included within a range (indicated by hatching) which is 15% of the radius r of the optical information recording medium from the center C of the optical information recording medium (the center of the circle of the disc-shaped optical information recording medium). The position of the center of gravity G is preferably within a range of 12% of the radius r of the optical information recording medium from the center C, and more preferably within a range of 10%. For example, in the case of a CD, a CD-R, or a CD-RW, because the radius r of the optical information recording medium is usually 6 cm, the stabilization layer 16 is provided such that the center of gravity G is included within a range of a 9 mm radius from the center C, and preferably within a range of a 7.2 mm radius, and more preferably within a range of a 6.0 mm radius.

Further, the arrangement of the stabilization layer 16 affects how the sound spreads from the sound source such as a speaker or the like. If the stabilization layer 16 is provided at the entire surface of the light reflecting layer 14, the sound spreads in all directions. In contrast, when the stabilization layer 16 is provided at the outer peripheral portion of the surface of the light reflecting layer 14 as illustrated in FIG. 5A, the sound spreads horizontally. Although sound which spreads horizontally is desirable from the standpoint of music appreciation, it is difficult to obtain, through the structure of the sound source such as a speaker, such a sound. Therefore, in order to obtain such a sound, the stabilization layer 16 is preferably provided at the outer peripheral portion of the surface of the light reflecting layer 14. The stabilization layer 16 is preferably provided in a region at the outer side of a range of 50% of the radius r of the optical information recording medium from the center C of the optical information recording medium (with the center C of the optical information recording medium being positioned at 0% of the radius r), and is more preferably provided within a region at the outer side of a range of 54% of the radius r of the optical information recording medium, and is even more preferably provided in a region at the outer side of a range of 60% of the radius r of the optical information recording medium. For example, in the case of a CD, a CD-R, or a CD-RW, the stabilization layer 16 is preferably provided in a region at the outer side of a range of a 3 cm radius from the center C, and more preferably provided in a region at the outer side of a range of a 3.24 cm radius from the center C, and even more preferably provided in a region at the outer side of a range of a 3.6 cm radius from the center C.

The thickness of the stabilization layer 16 is determined, in consideration of the density of the material of the stabilization layer 16 and the surface area of the portions of the surface of the light reflecting layer 14 on which the stabilization layer 16 is provided, such that a mass of about 0.001 to about 5.0 g is added to the entire optical information recording medium. The thickness of the stabilization layer 16 is preferably 1 to 300 μm, and more preferably 3 to 200 μm. The thickness of the stabilization layer 16 is preferably 1.5 to 6 times the thickness of the coloring agent layer 24 which will be described layer. In the same way as the coloring agent layer 24, it is preferable that the stabilization layer 16 includes a coloring agent whose wavelength of maximum reflection is in the band of 400 to 560 nm.

The coloring agent layer 24 contains a coloring agent whose wavelength of maximum reflection is in the band of 400 to 560 nm.

The wavelength of recording/playback light of recording/playback devices which are presently used is 780 nm. Since the coloring agent layer provided between the stabilization layer and the light reflecting layer contains a coloring agent having a wavelength of maximum reflection in the band of 400 to 560 nm, which is a complementary color of the recording/playback light, the clarity of sound improves, and the sound quality is improved even more. Although the reasons why the clarity of sound improves are not clear, it is thought that the coloring agent layer absorbs scattered light from the light reflecting layer, leading to a reduction in errors in writing or reading at the time of recording and playback, which errors are due to scattered light.

The coloring agent may be a pigment or may be a dye, but from the standpoint of the external appearance, coloring is preferably carried out by using a colored transparent ink. By using a colored transparent ink, the average regular reflectance with respect to light in a wavelength range of 400 to 700 nm at the portions at which the colored transparent ink is applied can be made to be in a range of 3 to 80%. The rainbow-colored reflectance characteristic, which is based on the optical diffraction effect and on the metal luster which the optical disc itself has, can thereby be utilized. Here, "colored transparent ink" refers to inks, such as pigment inks, other than inks whose light diffusion is high and whose regular reflectance is substantially zero. "Colored transparent ink" does not cover colorless transparent inks. UV-curing inks are preferable examples of the colored transparent inks. In a case in which two or more colored transparent inks having different absorption wavelengths are used, by applying these inks one on top of another, the wavelength spectrum of the reflected light at the surface, of an optical information recording medium on which a label or the like is printed, which surface is opposite the side on which recording light and playback light are incident can be adjusted. For example, when a blue-colored transparent ink is applied onto a portion at which a yellow-colored transparent ink has been applied, the portions at which the inks are applied in this superposed manner will color to green due to color mixing in accordance with the subtractive color process. Further, the thickness of the coloring agent layer 24 is preferably from 1 to 20 μm, and more preferably from 5 to 10 μm.

The transparent substrates 12 and 18 are disc-shaped transparent resin plates. Here, "transparent" means transparent with respect to the playback light, or transparent with respect to the recording light and the playback light. Namely, "transparent" means that the recording light and/or the playback light are not absorbed. Examples of the material for the substrate include polycarbonate; acrylic resins such as polymethyl methacrylate; vinyl chloride resins such as polyvinylchloride, and vinyl chloride copolymers; epoxy resins; amorphous polyolefin, glass, polyester, and the like. Combinations of these materials can be used if desired. Among these materials, amorphous polyolefin and polycarbonate are preferable and polycarbonate is particularly preferable from the standpoints of moisture-resistance, dimensional stability and cost. Further, the thickness of the transparent substrates 12 and 18 is preferably 1.2±0.2 mm.

Guide grooves for tracking and pits, which express information such as digital signals, are formed in advance by injection molding in the transparent substrate 12 of a CD. Further, guide grooves for tracking and pre-grooves, which express information such as address signals, are formed in the transparent substrate 18 of a CD-R or a CD-RW. The average pitch of these pre-grooves is preferably 0.1 to 50 μm, more preferably 0.2 to 30 μm, and even more preferably 0.3 to 10 μm. Further, the average depth of the pre-grooves is preferably 10 to 5000 nm, more preferably 30 to 3000 nm, and even more preferably 50 to 1000 nm.

In the case of a CD-R or a CD-RW for audio use, an application code, which identifies that the disc is for audio use, may be recorded in advance as a wobble for the pre-groove.

Even more improved sound quality can be achieved by using the transparent substrates 12 and 18, which have a low transmittance with respect to light of wavelengths shorter than the playback wavelength. More specifically, by making the average transmittance of the transparent substrates 12 and 18, with respect to light in the wavelength band of from 200 nm to a wavelength which is 50 nm shorter than the playback wavelength, 50% or less, preferably 40% or less, and more preferably 30% or less, an even greater improvement in the sound quality can be achieved, and good sound quality can be maintained for a long period of time. Although the reason for the improvement in sound quality is not clear, it is thought that by making the average transmittance with respect to light in a wavelength band of from 200 nm to a wavelength 50 nm shorter than the playback wavelength 50% or less, light other than the playback light does not reach the detector at the time of playback, and noise is reduced, thereby improving sound quality. Further, it is thought that improving the light-resistance of the optical information recording medium leads to the sound quality improving effect being maintained over a long period of time. For example, in a CD, CD-R, or CD-RW, the playback wavelength is generally 780 nm, and the average transmittance with respect to light in the wavelength band of 200 to 730 nm is made to be 50% or lower. In a DVD, DVD-R, or DVD-RW, the playback wavelength is generally 650 nm, and the average transmittance with respect to light in the wavelength band of 200 to 600 nm is made to be 50% or less. Adjustment of the transmittances of the transparent substrates 12 and 18 can be carried out by coloring the transparent substrates 12 and 18 by using a coloring agent such as a pigment, a dye or the like. Specifically, by appropriately varying the amount of coloring agent which is compounded into the substrate, the transmittances of the transparent substrates 12 and 18 can be adjusted.

The transparent substrates 12 and 18 can be colored, for example, by mixing a coloring agent into a resin such as polycarbonate, which is the material for the substrate, at the time of molding the transparent substrates 12 and 18. Or, the transparent substrates 12 and 18 can be colored by soaking the transparent substrates 12 and 18 in a dye after they have been molded. Further, when a coloring agent is mixed into the resin which is the substrate material, the coloring agent can be mixed directly into the resin which is the substrate material. Moreover, resin pellets in which a coloring agent is mixed-in in advance (such pellets are called the master batch) may be mixed-in into the resin which is the substrate material.

The coloring agent and the master batch used in coloring the transparent substrates 12 and 18 are not particularly limited. Existing pigments or dyes which absorb light in a wavelength range from 200 nm to a wavelength 50 nm shorter than the playback wavelength, or a master batch containing such a pigment or dye can be suitably selected in accordance with the wavelength of the playback light. These coloring agents can be used singly, or a combination of two or more may be used. In order to prevent color fading, it is preferable that the pigment or dye has excellent light-resistance and heat-resistance. Further, although a dyestuff for the recording layer which will be described later is generally unstable, if the dyestuff can exist in a stable state within the substrate, dyestuffs of the same type as the dyestuffs of the recording layer can also be used. The amount of the coloring agent contained in the transparent substrates 12 and 18 is preferably 0.1 to 20 wt %, and more preferably 0.5 to 10 wt %. If the contained amount of the coloring agent is too low, the coloring agent will not be mixed in uniformly in the substrate. If the contained amount of the coloring agent is too large, a large amount of the master batch will be used, the manufacturing process will become large-scale, and manufacturing costs will increase, which is not preferable. In order to not impede the transmission of the recording light or the playback light, it is preferable that there is no absorption by the coloring agent of light within 50 nm of the recording wavelength and the playback wavelength, and it is more preferable that there is no absorption by the coloring agent of light within 100 nm of the recording wavelength and the playback wavelength.

The transmittances of the transparent substrates 12 and 18 may be adjusted by providing a transmittance adjusting layer, which contains a coloring agent, on the surface of the transparent substrate 12 or 18. From the standpoint of ease of formation, it is preferable to provide the transmittance adjusting layer on the surface of the transparent substrate 12 or the transparent substrate 18, at the side on which the recording light and playback light are incident. However, the transmittance adjusting layer may also be provided on the surface of the transparent substrate 12 or the transparent substrate 18 which surface is at the side opposite the side on which the recording light and playback light are incident. The transmittance reflecting layer may be formed as follows: one or more of the aforementioned coloring agents and a binder are dissolved or dispersed in an appropriate solvent so as to prepare a coating solution, and thereafter, the coating solution is applied onto the substrate surface by using a coating method such as spin coating or the like. The thickness of the transmittance adjusting layer is preferably 0.5 to 30 $\mu$m, and more preferably 1 to 10 $\mu$m.

The light reflecting layer 14 is provided on the substrate in order to improve the reflectance. When the light absorbing layer 20 which will be discussed later is provided, the light reflection layer 14 is provided on the light absorbing layer 20. Any light reflecting substance having a high reflectance of laser light may be used as the material for the light reflecting layer 14. The reflectance of the material is preferably 30% or greater, more preferably 50% or greater, and even more preferably 70% or greater. Examples of materials for the light reflecting layer 14 include metals and metalloids such as Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn and Bi, as well as stainless steel. Among these, Cr, Ni, Pt, Cu, Ag, Au, Al and stainless steel are preferable. These substances may be used singly, or a combination of two or more may be used. Further, the substances may be used as an alloy. It is particularly preferable that the material of the light reflecting layer 14 is Au, Ag, Al, or an alloy thereof. The light reflecting layer 14 may be formed by depositing, sputtering, or ion plating the aforementioned light reflecting substance. The thickness of the light reflecting layer 14 is generally in the range of 10 to 800 nm, preferably in the range of 20 to 500 nm, and more preferably in the range of 50 to 300 nm.

In a writable optical information recording medium, the light absorbing layer 20 is provided between the transparent substrate 18 and the light reflecting layer 14. The light absorbing layer 20 may be a dyestuff recording layer in which recording is carried out by a dyestuff, a phase change recording layer in which recording is carried out by a change of phase, or a photomagnetic recording layer in which recording is carried out by photomagnetism. A dyestuff recording layer is preferable from the standpoints of ease of formation and stability.

The dyestuff used in the dyestuff recording layer is not particularly limited, and examples of dyestuffs which can be used are cyanine dye, phthalocyanine dye, imidazoquinoxaline dye, pyrylium dye, thiopyrylium dye, azulenium dye, squarylium dye, metal complex salts of Ni, Cr and the like, naphthoquinone dye, anthraquinone dye, indophenol dye, indoaniline dye, triphenylmethane dye, merocyanine dye, oxonol dye, aminium dye, diimmonium dye, nitroso compounds, and the like.

The dyestuff recording layer is formed by applying a solution in which a dyestuff is dissolved in an appropriate solvent. The concentration of the dyestuff in the coating liquid is generally 0.01 to 15 wt %, preferably 0.1 to 10 wt %, more preferably 0.5 to 5 wt %, and most preferably 0.5 to 3 wt %. Examples of solvents of the coating liquid for forming the dyestuff recording layer are esters such as butyl acetate, cellusolve acetate and the like; ketones such as methyl ethyl ketone, cyclohexanone, methyl isobutyl ketone, and the like; chlorinated hydrocarbons such as dichloromethane, 1,2-dichloroethane, chloroform, and the like; amides such as dimethylformamide and the like; hydrocarbons such as cyclohexane and the like; ethers such as tetrahydrofuran, ethyl ether, dioxane and the like; alcohols such as ethanol, n-propanol, isopropanol, n-butanol, diacetone alcohol, and the like; fluorine containing solvents such as 2,2,3,3-tetrafluoropropanol and the like; glycol ethers such as ethyleneglycol monomethylether, ethyleneglycol monoethylether, propyleneglycol monomethylether, and the like; and the like. In consideration of the solubility of the dyestuff which is used, the above solvents may be used singly or a combination of two or more types thereof may be used. Fluorine containing solvents such as 2,2,3,3-tetrafluoropropanol are preferably used. Further, the thickness of the dyestuff recording layer is generally 20 to 500 nm, and preferably 50 to 300 nm.

If desired, fading-preventing agents and binders may be added to the coating solution for forming the dyestuff recording layer. Moreover, any of various types of additives such as anti-oxidants, UV light absorbers, plasticizers, lubricants and the like may be used in accordance with the object. Representative examples of fading-preventing agents are nitroso compounds, metal complexes, diimmonium salts, and aminium salts. Examples thereof are disclosed in, for example, JP-A-2-300288, JP-A-3-224793, JP-A-4-146189 and the like. Examples of the binder include natural organic polymers such as gelatin, cellulose derivatives, dextran, rosin, rubber and the like; as well as synthetic organic polymers such as hydrocarbon resins (polyethylene, polypropylene, polystyrene, polyisobutylene, and the like), vinyl resins (polyvinyl chloride, polyvinylidene chloride, vinyl chloride-vinyl acetate copolymers, and the like), acrylic resins (polymethyl acrylate, polymethyl methacrylate, and the like), polyvinyl alcohol, chlorinated polyethylene, epoxy resins, butyral resins, rubber derivatives, initial condensation products of thermosetting resins such as phenol-formaldehyde resins, and the like. When a binder is used, the amount thereof is generally 20 parts by weight or less, preferably 10 parts by weight or less, and more preferably 5 parts by weight or less, with respect to 100 parts by weight of the dyestuff.

When the light absorbing layer 20 is provided, a substratum may be provided on the surface of the transparent substrate 18 at which the light absorbing layer 20 is provided, in order to improve the flatness, improve the adhesion, and prevent changing of properties of the light absorbing layer 20. Examples of the material for the substratum are polymers such as polymethyl methacrylate, acrylate-methacrylate copolymers, styrene-anhydrous maleic acid copolymers, polyvinyl alcohol, N-methylolacrylamide, styrene-vinyltoluene copolymers, chlorosulfonated polyethylene, nitrocellulose, polyvinyl chloride, chlorinated polyolefin, polyester, polyimide, vinyl acetate-vinyl chloride copolymers, ethylene-vinyl acetate copolymers, polyethylene, polypropylene, polycarbonate, and the like; and surface modifying agents such as silane coupling agents or the like. The substratum may be prepared as follows: the above substance is dissolved or dispersed in an appropriate solvent so as to prepare a coating liquid, and the coating liquid is applied to the surface of the substrate by using a coating method such as spin coating, dip coating, extrusion coating or the like. The thickness of the substratum is generally 0.05 to 20 µm, and preferably 0.01 to 10 µm.

It is preferable to provide a protective layer on the light reflecting layer 14 from the standpoint of improving the moisture resistance and scratch resistance of the optical information recording medium. If a protective layer is provided, the above-described stabilization layer 16 and coloring agent layer 24 are provided on the protective layer. Examples of the material used for the protective layer are inorganic substances such as SiO, $SiO_2$, $MgF_2$, $SnO_2$, $Si_3N_4$ and the like; and organic substances such as thermoplastic resins, thermosetting resins, UV-curing resins and the like. The protective layer can be formed by, for example, laminating a film, which is obtained by extruding a plastic, on the light reflecting layer via an adhesive. Or, the protective layer can be formed by a method such as vacuum deposition, sputtering, coating or the like. Moreover, when a thermoplastic resin or a thermosetting resin is used as the material for the protective layer, the protective layer may be formed by dissolving the thermoplastic resin or the thermosetting resin in an appropriate solvent so as to prepare a coating liquid, and thereafter, applying and drying the coating liquid. When a UV-curing resin is used as the material, the protective layer may be formed by applying the UV-curing resin or a coating liquid in which the UV-curing resin is dissolved in an appropriate solvent and curing it by irradiating UV light. Various additives such as antistatic agents, anti-oxidants, UV light absorbers and the like may be added to the coating liquid in accordance with the object. The thickness of the protective layer is generally in the range of 0.1 to 100 µm.

Figure 9:
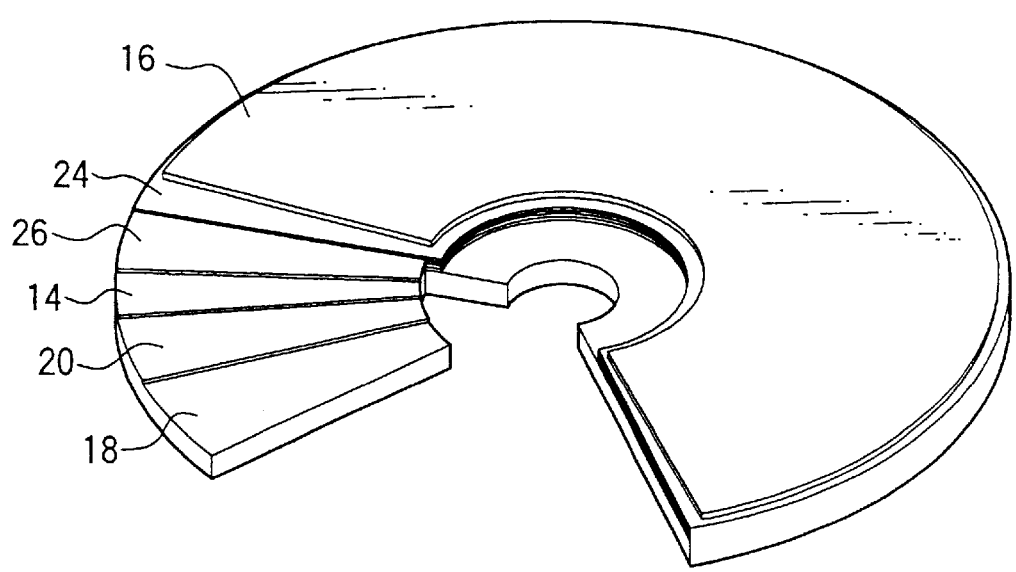
FIG. 9 is a perspective view of another CD-R according to the present invention.

FIGS. 8 and 9 illustrate a CD-R which is a writable optical information recording medium and which is the optical information recording medium of the present invention.

The CD-R illustrated in FIG. 8 is formed by the disc-shaped transparent substrate 18 in which a center hole is formed at the central portion thereof, the light absorbing layer 20 formed from a dyestuff recording layer containing an organic dyestuff, the light reflecting layer 14, the protective layer 26, the coloring agent layer 24, and the stabilization layer 16. A spiral pre-groove is formed on the transparent substrate 18 in a region that is within a predetermined radius and which is other than the peripheral portion of the center hole and the outer peripheral portion of the transparent substrate 18. The light absorbing layer 20 is provided on the region of the transparent substrate 18 at which the pre-groove is formed. The light reflecting layer 14 is provided on the light absorbing layer 20 so as to cover the light absorbing layer 20, and the protective layer 26 is provided on the light reflecting layer 14 so as to cover the light reflecting layer 14. The coloring agent layer 24 is provided on the protective layer 26 so as to cover the protective layer 26. The stabilization layer 16 is provided at the outer peripheral portion of the surface of the coloring agent layer 24.

The CD-R illustrated in FIG. 9 is structured in the same way as the CD-R illustrated in FIG. 8, except that the stabilization layer 16 is provided at the entire surface, i.e., is provided so as to cover the coloring agent layer 24. The same reference numerals as those used for the CD-R illustrated in FIG. 8 are used for the CD-R illustrated in FIG. 9, and description of similar portions is omitted.

The optical information recording medium of the present invention can be applied to DVDs (digital video discs), such as DVDs, DVD-Rs, DVD-RWs and the like, which enable even higher density recording. A DVD has basically the same structure as that of a CD, such as a CD, a CD-R, a CD-RW or the like, except that, in a DVD, the track pitches of pits or the pre-groove formed in the transparent substrate are more narrow. In the same way as described above, the stabilization layer and the coloring agent layer can be provided on the light reflecting layer or on the protective layer.

DVD-Rs and DVD-RWs can be manufactured by laminating the disc-shaped transparent substrate, on which at least the light absorbing layer is provided, and a protective substrate having the same size as the transparent substrate, by using an adhesive and such that the light absorbing layer is disposed at the inner side. In this case, the stabilization layer and the coloring agent layer can be provided on the protective substrate. In this laminated structure, a transparent substrate having a diameter of 120±3 mm and a thickness of 0.6±0.1 mm is generally used, and the thickness of the optical information recording medium after lamination is adjusted to be 1.2±0.2 mm. The laminating may be carried out by using the UV-curing resin used for forming the protective layer, or may be carried out by using a synthetic adhesive. Or, the transparent substrate and the protective substrate may be laminated by using double-sided tape. The track pitch of the pits or the pre-groove formed in the transparent substrate is generally in the range of 0.6 to 0.9 µm, and the depth of the pre-groove is preferably 80 to 300 nm and more preferably 100 to 250 nm. Further, the half-width of the pre-groove is preferably in a range of 0.1 to 0.5 µm.

EXAMPLES

Hereinafter, the present invention will be described in detail by way of Examples.

Examples 1–10, Comparative Examples 1–3
(Production of CD-R Disc)

Substrates (regular substrates) (diameter: 120 mm, thickness: 1.2 mm), having a spiral pre-groove (track pitch: 1.6

μm, pre-groove width: 0.4 μm, pre-groove depth: 0.16 μm) formed therein which were injection-molded were formed by using transparent polycarbonate pellets (PANLITE AD5503, manufactured by Teijin Co., Ltd.). 2.65 g of the following indolenine dye (A), 0.265 g of the following color fading preventing agent (B), and 0.133 g of a binder (CA-139 manufactured by Morton Co.) were dissolved in 100 ml of 2,2,3,3,-tetrafluoropropanol over 10 hours by using an ultrasonic vibrator (1800 W), so as to prepare a coating liquid for the recording layer.

Indolenine Dye (A)

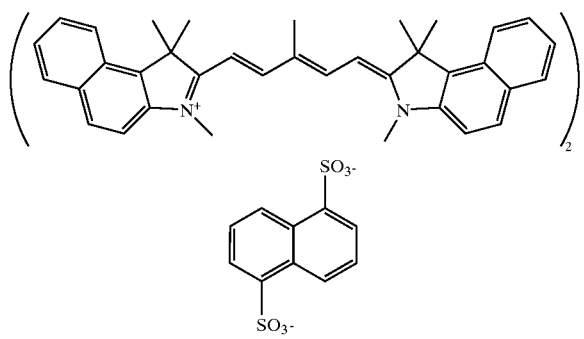

Color Fading Preventing Agent (B)

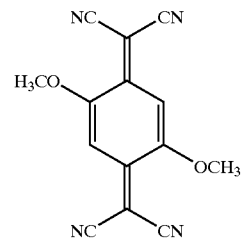

This coating solution was applied to the pre-groove side surface of the above polycarbonate substrates by spin coating while varying the rotation speed from 300 rpm to 4000 rpm. The coated substrates were then dried such that a dyestuff recording layer (thickness (within the pre-groove): about 200 nm) was formed thereon. The conditions for forming the dyestuff recording layer were as follows: ambient temperature and humidity: 23° C., 50% RH; temperature of coating liquid: 23° C.; temperature of substrate: 23° C.; ventilation air speed: 0.1 m/sec. Next, a light reflecting layer having a film thickness of 150 nm was formed on the dyestuff recording layer on each of the substrates by spattering Ag. Then, a UV-curing resin (SD-318 manufactured by DaiNippon Ink and Chemicals Co., Ltd.) was spin coated on the light reflecting layer formed on each of the substrates while the rotational speed was varied from 50 rpm to 5000 rpm. After coating, ultraviolet light was irradiated from above from a high-pressure mercury lamp such that the UV-curing resin hardened to form a protective layer of a thickness of 8 μm.

A stabilization layer, or a coloring agent layer and a stabilization layer were formed, by varying the following conditions in various ways as shown in Table 1, on the protective layer so as to obtain CD-Rs. For each of the CD-Rs, the position of the center of gravity substantially coincided with the center of the disc. When a stabilization layer was provided on the outer peripheral portion, the stabilization layer was provided along the entire circumference in a region at the outer side of a range which was r% of the radius of the CD-R disc from the center thereof.

Conditions:
- wavelength of maximum reflection of coloring agent
- presence or absence of coloring agent layer, and thickness when present
- density of stabilization layer material
- position of stabilization layer
- thickness of stabilization layer
- wavelength of maximum reflection of stabilization layer

TABLE 1

|  | | Coloring Agent Layer | | Stabilizer Layer | | | | |
| --- | --- | --- | --- | --- | --- | --- | --- | --- |
|  | Transparent Substrate | Wavelength of Maximum Reflection (nm) | Presence/ Absence and Thickness (μm) | Presence/ Absence and Density of Material (g/cm$^3$) | Formed Position (r) | Thickness (μm) | Wavelength of Maximum Reflection (nm) | Evaluation Score |
| Ex. 1 | regular | — | not present | 1.4 | entire surface | 10 | 560 | 78 |
| Ex. 2 | regular | — | not present | 1.7 | entire surface | 10 | 560 | 78 |
| Ex. 3 | regular | — | not present | 3.0 | entire surface | 10 | 560 | 76 |
| Ex. 4 | regular | — | not present | 4.2 | entire surface | 10 | 560 | 74 |
| Ex. 5 | regular | — | not present | 1.7 | 70 | 20 | 520 | 88 |
| Ex. 6 | regular | 530 | 10 | 1.7 | 70 | 23 | 520 | 98 |
| Ex. 7 | regular | 530 | 10 | 1.7 | 80 | 15 | 520 | 96 |
| Ex. 8 | regular | 650 | 10 | 1.7 | 90 | 22 | 650 | 84 |
| Ex. 9 | regular | 650 | 9 | 1.7 | 60 | 23 | 460 | 90 |
| Ex. 10 | regular | 460 | 10 | 1.7 | 50 | 23 | 460 | 86 |
| Ex. 11 | (A) | — | not present | 1.7 | entire surface | 10 | 560 | 89 |
| Ex. 12 | (A) | — | not present | 4.2 | entire surface | 10 | 560 | 85 |
| Ex. 13 | (A) | — | not present | 1.7 | entire surface | 20 | 560 | 97 |
| Ex. 14 | (B) | — | not present | 1.7 | entire surface | 20 | 560 | 93 |

TABLE 1-continued

|  | Trans-parent Substrate | Coloring Agent Layer | | Stabilizer Layer | | | | Evaluation Score |
|---|---|---|---|---|---|---|---|---|
|  |  | Wavelength of Maximum Reflection (nm) | Presence/Absence and Thickness (μm) | Presence/Absence and Density of Material (g/cm³) | Formed Position (r) | Thickness (μm) | Wavelength of Maximum Reflection (nm) |  |
| Ex. 15 | regular | 530 | 10 | 1.7 | 67 | 23 | 520 | 99 |
| Ex. 16 | regular | 460 | 10 | 1.7 | 50 | 23 | 460 | 87 |
| Comp. Ex. 1 | regular | — | not present | not present | — | — | — | 70 |
| Comp. Ex. 2 | regular | 560 | 10 | 1.2* | — | — | — | 72 |
| Comp. Ex. 3 | regular | — | not present | 4.3 | entire surface | 10 | 560 | 68 |
| Comp. Ex. 4 | (B) | — | not present | not present | — | — | — | 72 |

*Density of material of coloring agent layer.

The nine musical compositions listed in following Table 2 were recorded on the obtained CD-Rs by using a commercially-available CD-R recorder (recording wavelength 780 nm). Four music critics listened to the playback sound obtained by playing-back the recorded CD-Rs on a commercially-available CD player (playback wavelength: 780 nm). The critics evaluated the sound quality on the basis of the volume of the sound, clarity of the sound, tone color, and sound field (spreading of sound). The CD-R which was not provided with a coloring agent layer and a stabilization layer was given an evaluation score of 70 points. Using this as a standard, the CD-Rs which exhibited a clear improvement in sound quality were given a score of 80 points or more, and those which showed a marked improvement in sound quality were awarded an evaluation score of 90 points or more. The results of evaluation are shown in Table 1.

whose wavelength of maximum reflection was in a band of 400 to 560 nm received a particularly good sound quality evaluation.

Examples 11–14, Comparative Example 4

A black colored substrate (A) (thickness: 0.6 mm, inner diameter: 15 mm, outer diameter: 120 mm) having a spiral pre-groove (pre-groove width: 300 nm, pre-groove depth: 150 nm) formed therein was prepared by using a resin material in which 3.5 wt % of a master batch (MAKROLON DP1-1219 manufactured by Bayer Ltd.) was compounded with transparent polycarbonate pellets (PANLITE AD5503 manufactured by Teijin Co.) by injection molding. Further, a violet colored substrate (B) (thickness: 0.6 mm, inner diameter: 15 mm, outer diameter: 120 mm) having a spiral pre-groove (pre-groove width: 300 nm, pre-groove depth:

TABLE 2

| No. | Name of Composition | Composer | Performer | Notes |
|---|---|---|---|---|
| 1 | "Feelin' Good Paradise" |  | Da Pump | Treble and bass of Japanese popular music |
| 2 | "S'il Suffisait D'Aimer" |  | Celene Dion | Ordinary treble of female vocal |
| 3 | "Tender" | Blur | Blur | Male vocal, guitar solo, and bass voids |
| 4 | "My Heart Will Go On" | J. Horner and W. Jennings | Great Jazz Trio + 1 | Can positional relationships between saxophone and mini-band be distinguished? |
| 5 | "The Man I Love" | G. Gershwin | Joni Mitchell | Typical jazz-recorded female vocal |
| 6 | "Summertime in Venice" | A. Ichini | Eiji Yamamoto | Bass peculiar to pianos, with a delicate touch |
| 7 | "From the New World", Symphony No. 9 in E Minor, Fourth Movement | Dvorak | Neumann/Czech Philharmonic Orchestra | Can sounds of respective instruments in orchestra be distinguished? Extensions of sound of brass; orchestral modulations |
| 8 | Hungarian Dance No. 5 in G Minor | Brahms | Akiko Suwanai | Violin tones |
| 9 | Queen of the Night aria from "The Magic Flute" | Mozart | Natalie Dessay | Soprano coloraturas, sharpness of voice |

As is clear from Table 1, the CD-Rs on which stabilization layers having densities from 1.4 to 4.2 g/cm³ were provided received overall evaluations of sound quality which were better than those of CD-Rs on which no stabilization layers were provided. Further, the CD-R having the stabilization layer provided at the outer periphery thereof had the highest evaluation among CD-Rs provided with stabilization layers. The CD-R which was provided with a stabilization layer as well as a coloring agent layer containing a coloring agent 150 nm) formed therein was prepared by using a resin material in which 4.0 wt % of a master batch (MAKROLON NEON RED 001 manufactured by Bayer Ltd.) was compounded with transparent polycarbonate pellets (PANLITE AD5503 manufactured by Teijin Co.) by injection molding.

Figure 10:
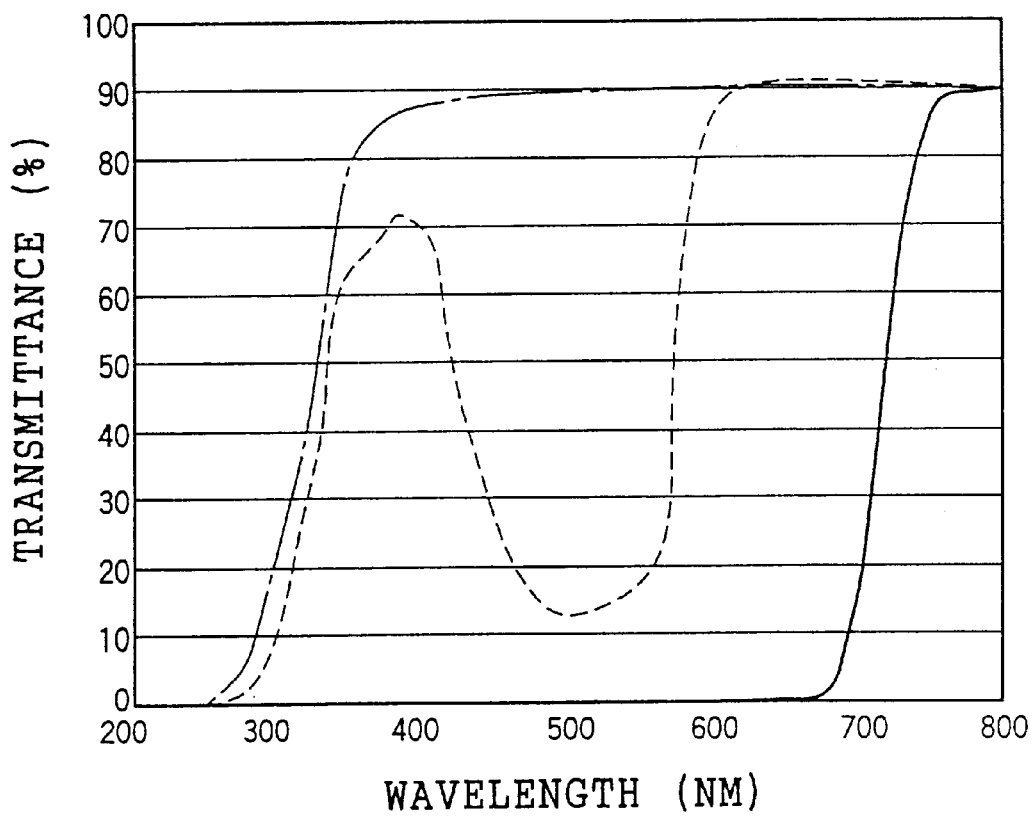
FIG. 10 is a graph illustrating transmission spectra of substrates.

The obtained colored substrate (A) had an average transmittance with respect to light in a wavelength range of 200–730 nm of 4%, and the obtained colored substrate (B) had an average transmittance with respect to light in a wavelength range of 200–730 nm of 47%. The above transparent substrate which was not colored and which was made of polycarbonate had an average transmittance with respect to light in a wavelength range of 200–730 nm of 61%. The transmission spectra in the wavelength band of 200 to 800 nm of these substrates are illustrated in FIG. 10. The transmission spectrum of the colored substrate (A) is shown by the solid line, the transmission spectrum of the colored substrate (B) is shown by the dotted line, and the transmission spectrum of the transparent substrate which was not colored and which was formed of polycarbonate is shown by the one-dot chain line. As can be seen from FIG. 10, the colored substrate (B) allowed the passage of light in a vicinity of 400 nm and in a vicinity of 600 nm, and, as mentioned above, had an average transmittance with respect to a wavelength range of 200 to 730 nm of 47%.

A dyestuff recording layer, a light reflecting layer, and a protective layer in the same way as in Example 1, were formed by using the colored substrates (A) and (B). A stabilization layer was formed, by varying various conditions, on the protective layer so as to obtain CD-Rs.

The nine musical compositions listed in Table 2 were recorded on the obtained CD-Rs by using a commercially-available CD-R recorder (recording wavelength 780 nm). Four music critics listened to the playback sound obtained by playing-back the recorded CD-Rs on a commercially-available CD player (playback wavelength: 780 nm). The critics evaluated the sound quality in the same way as in the previously described Examples. The results of evaluation are shown in Table 1. As is clear from Table 1, the CD-Rs which had the colored substrate (A) or (B) and on which a stabilization layer having a density of from 1.4 to 4.2 g/cm$^3$ was provided had particularly high sound quality evaluations, in the same way as the CD-Rs on which the coloring agent layers were provided in Examples 6 through 10. Further, the recorded CD-Rs of Examples 11 through 14 were irradiated with light for 100 hours by using a fademeter equipped with a xenon lamp, and thereafter, four music critics listened to the playback sound obtained by playing-back the recorded CD-Rs on the commercially-available CD player. The critics evaluated the sound quality in the same way as before irradiation. Results of evaluation showed that the sound quality did not change, and that the excellent sound quality was maintained.

Examples 15, 16

Preparation of CDs

Substrates (diameter: 120 nm, thickness: 1.2 mm), on which digital signals of the respective nine compositions listed in Table 2 were recorded as pits in the substrate surface, were formed by using transparent polycarbonate pellets (PANLITE AD5503 manufactured by Teijin Co.) by injection molding. A light reflecting layer of a film thickness of 150 nm was formed by sputtering Ag on the surface of each polycarbonate substrate in which surface the pits were formed. A UV-curing resin (SD-310 manufactured by DaiNippon Ink and Chemicals Co., Ltd.) was applied onto the light reflecting layer by spin coating while varying the rotational speed from 50 rpm to 5000 rpm. After application, the UV-curing resin was hardened by ultraviolet light being illuminated thereon by a high-pressure mercury lamp from above, such that a protective layer having a thickness of 8 μm was formed.

A stabilization layer, or a coloring agent layer and a stabilization layer, were formed on the protective layer by varying various conditions in the same way as in Examples 1–10, so as to obtain CDs. The position of the center of gravity substantially coincided with the position of the center of the disc.

Four music critics listened to the playback sound obtained by playing-back the obtained CD-Rs on the commercially-available CD player. The critics evaluated the sound quality in the same way as in the previously-described Examples. The results of evaluation are shown in Table 1. As is clear from Table 1, the CDs which had, in addition to the coloring agent layer, a stabilization layer of a density of from 1.4 to 4.2 g/cm$^3$ at the periphery thereof received high evaluations.

What is claimed is:

1. An optical information recording medium comprising:
   either a disk-shaped transparent substrate on which is provided a recording portion formed from a light absorbing layer in which information can be recorded by laser light, or a disk-shaped transparent substrate provided with a recording portion in which information which can be played-back by laser light is recorded;
   a light reflecting layer provided on the recording portion; and
   a stabilization layer formed from a material having a density of 1.4 to 4.2 g/cm$^3$ and provided on the light reflecting layer, such that a center of gravity of the optical information recording medium is included within a range of 15% of a radius of the optical information recording medium from a center of the optical information recording medium.

2. An optical information recording medium according to claim 1, wherein the stabilization layer is provided within a region which is at an outer side of a range of 50% of the radius of the optical information recording medium from the center of the optical information recording medium.

3. An optical information recording medium, comprising:
   either a disk-shaped transparent substrate on which is provided a recording portion formed from a light absorbing layer in which information can be recorded by laser light, or a disk-shaped transparent substrate provided with a recording portion in which information which can be played-back by laser light is recorded;
   a light reflecting layer provided on the recording portion;
   a stabilization layer formed from a material having a density of 1.4 to 4.2 g/cm$^3$ and provided on the light reflecting layer, such that a center of gravity of the optical information recording medium is included within a range of 15% of a radius of the optical information recording medium from a center of the optical information recording medium; and
   a coloring agent layer between the stabilization layer and the light reflecting layer, the coloring agent layer containing a coloring agent having a wavelength of maximum reflection in a band of 400 to 560 nm.

4. An optical information recording medium, comprising:
   either a disk-shaped transparent substrate on which is provided a recording portion formed from a light absorbing layer in which information can be recorded by laser light, or a disk-shaped transparent substrate provided with a recording portion in which information which can be played-back by laser light is recorded;
   a light reflecting layer provided on the recording portion;
   a stabilization layer formed from a material having a density of 1.4 to 4.2 g/cm$^3$ and provided on the light reflecting layer, such that a center of gravity of the optical information recording medium is included within a range of 15% of a radius of the optical information recording medium from a center of the optical information recording medium, wherein the stabilization layer is provided within a region which is at an outer side of a range of 50% of the radius of the optical information recording medium from the center of the optical information recording medium; and a coloring agent layer between the stabilization layer and the light reflecting layer, the coloring agent layer containing a coloring agent having a wavelength of maximum reflection in a band of 400 to 560 nm.

5. An optical information recording medium according to claim 3, wherein the coloring agent is a colored transparent ink.

6. An optical information recording medium according to claim 3, further comprising a protective layer provided between the coloring agent layer and the light reflecting layer.

7. An optical information recording medium according to claim 3, wherein a thickness of the stabilization layer is at least 1.5 times greater than a thickness of the coloring agent layer.

8. An optical information recording medium according to claim 4, wherein a thickness of the stabilization layer is at least 1.5 times greater than a thickness of the coloring agent layer.

9. An optical information recording medium according to claim 1, further comprising a protective layer provided between the stabilization layer and the light reflecting layer.

10. An optical information recording medium according to claim 1, wherein the transparent substrate has an average transmittance of 50% or less with respect to light in a wavelength band of from 200 nm to a wavelength which is 50 nm shorter than a playback wavelength.

11. An optical information recording medium according to claim 2, wherein the transparent substrate has an average transmittance of 50% or less with respect to light in a wavelength band of from 200 nm to a wavelength which is 50 nm shorter than a playback wavelength.

12. An optical information recording medium according to claim 3, wherein the transparent substrate has an average transmittance of 50% or less with respect to light in a wavelength band of from 200 nm to a wavelength which is 50 nm shorter than a playback wavelength.

13. An optical information recording medium according to claim 4, wherein the transparent substrate has an average transmittance of 50% or less with respect to light in a wavelength band of from 200 nm to a wavelength which is 50 nm shorter than a playback wavelength.

14. An optical information recording medium according to claim 7, wherein the transparent substrate has an average transmittance of 50% or less with respect to light in a wavelength band of from 200 nm to a wavelength which is 50 nm shorter than a playback wavelength.

15. An optical information recording medium according to claim 8, wherein the transparent substrate has an average transmittance of 50% or less with respect to light in a wavelength band of from 200 nm to a wavelength which is 50 nm shorter than a playback wavelength.

16. An optical information recording medium according to claim 1, wherein the stabilization layer is formed of at least one of an inorganic substance, a thermoplastic resin, a thermosetting resin, and a UV-curing resin.

17. An optical recording medium according to claim 1, wherein a thickness of the stabilization layer is 1 to 300 $\mu$m.

18. An optical recording medium according to claim 3, wherein a thickness of the stabilization layer is 1 to 300 $\mu$m.

19. An optical recording medium according to claim 3, wherein a thickness of the coloring agent layer is 1 to 20 $\mu$m.

20. An optical recording medium according to claim 4, wherein a thickness of the coloring agent layer is 1 to 20 $\mu$m.

* * * * *